United States Patent Office 3,291,732
Patented Dec. 13, 1966

3,291,732
SYNTHETIC LUBRICATING OIL THICKENED TO A GREASE CONSISTENCY WITH p-POLYPHENYL
Ilgvars J. Spilners, Monroeville, and Chester S. Tempalski, Pittsburgh, Pa., assignors to Gulf Research & Development Company, Pittsburgh, Pa., a corporation of Delaware
No Drawing. Filed Dec. 20, 1963, Ser. No. 332,259
4 Claims. (Cl. 252—28)

This invention relates to an improved lubricating composition and more particularly to a lubricant having the consistency of a grease suitable for high temperature lubrication.

The trend in design of modern aircraft has accentuated the need for a lubricant having the consistency of a grease which will lubricate anti-friction bearings operating at high rotational speeds and high temperatures. Considerable progress has been made in recent years in producing improved thickened lubricants for aircraft. For example, lubricating compositions having the consistency of a grease are now available for lubricating bearings operating at 10,000 to 20,000 revolutions per minute at temperatures up to about 400° F. However, great difficulty has been encountered in producing a lubricating composition having the consistency of a grease which will effectively lubricate bearings operating at speeds of 10,000 to 20,000 revolutions per minute and at temperatures up to about 600° F. for prolonged periods of time.

Since many of the lubricating characteristics of a thickened lubricant are imparted to the lubricant by the lubricating oil used in preparing the lubricant, a lubricating oil is required which is thermally stable at temperatures in the order of 600° F. While some lubricating compositions having the consistency of a grease have been prepared by thickening mineral lubricating oils, especially hydrotreated mineral lubricating oils, the volatility of mineral lubricating oils is such that as a general rule they do not give adequate lubrication at temperatures in the order of 600° F. over prolonged periods of time. Synthetic oils are substantially more resistant to thermal degradation than mineral oils. Synthetic oils, particularly the polyorgano siloxanes known as the silicone oils in addition to being more resistant to thermal degradation than mineral oils also have high viscosity indices making their use at high and ambient temperatures especially desirable. Thus, the lubricating oil employed in the composition of this invention is a synthetic lubricating oil.

Even though the synthetic lubricating oils have given improved lubricants, some difficulty has been encountered in producing a thickened synthetic lubricating oil which will give adequate lubrication of bearings operating at temperatures of 600° F. and speeds up to 20,000 revolutions per minute over a prolonged period of time.

We have discovered that a lubricating composition having improved lubricating characteristics for an extended period of time when used to lubricate bearings operating at temperatures up to about 600° F. and speeds of 10,000 to 20,000 revolutions per minute can be obtained by incorporating p-polyphenyl in a synthetic lubricating oil in oil thickening proportions. Thus, the improved lubricating composition of our invention comprises a dispersion in a synthetic lubricating oil of a sufficient amount to thicken the lubricating oil to a grease consistency of p-polyphenyl.

The p-polyphenyl employed in the composition of the invention can be prepared by known chemical procedure. The preparation of p-polyphenyl by the chloranil oxidation of poly-1,3-cyclohexadiene which was obtained by Ziegler polymerization is reported by C. S. Marvel and G. E. Hartzell, Journal American Chemical Society, 81, 448 (1959). The preparation of p-polyphenyl by polymerizing benzene under mild reaction conditions in the presence of an aluminum chloride-cupric chloride-water catalyst system is reported by P. Kovacic and A. Kyriakis, Journal American Chemical Society, 85, 454–458 (1963). An investigation of some of the reaction variables in the polymerization of benzene in an aluminum chloride-cupric chloride catalyst system is reported by P. Kovacic and J. Oziomek, Polymer Preprints—American Chemical Society Division of Polymer Chemistry, 4, No. 2, 57–68 (1963). The polymerization of benzene is believed to proceed in accordance with the following equation:

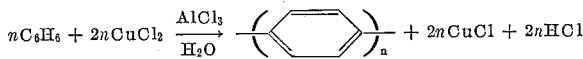

The amount of p-polyphenyl which we use may vary depending upon the particular lubricating base employed and upon the characteristics desired in the ultimate composition. In any event, the amount of p-polyphenyl used is an amount sufficient to thicken the lubricating oil to a grease consistency. In general this amount comprises about 10 to about 40 percent by weight of the total composition.

The synthetic lubricating oil which is employed in the composition of the invention is selected from the group consisting of the liquid polyorgano siloxanes having a high phenyl content and diphenylmethylsilyl end groups and polyaryl ethers. The polyorgano siloxanes can be obtained by hydrolyzing and polymerizing a mixture of diphenylmethylchlorosilane, dimethyldichlorosilane and diphenyldichlorosilane preferably in a ratio of 1:1:1, respectively, according to procedures known to those familiar with the art. While the polyorgano siloxanes are generally a mixture of polymers, a general formula representing the polymer mixture by an ideal molecule is as follows:

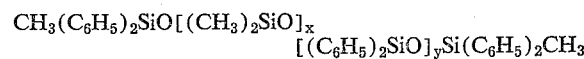

where $x$ and $y$ can be from 1 to 10 or more. An ideal molecule of a polyorgano siloxane having diphenylmethylsilyl end group and a molecular weight of 954 is represented by the formula

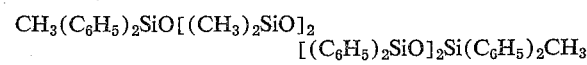

Exemplary of the polyaryl ethers which can be used are the polyphenyl ethers, i.e., m-bis(m-phenoxyphenoxy)benzene and m-bis(m-phenoxyphenoxy)phenyl ether.

The lubricating composition of this invention can contain conventional lubricant additives, if desired, to improve other specific properties of the lubricant without departing from the scope of the invention. Thus, the lubricating composition can contain an auxiliary thickening agent, a filler, a corrosion and rust inhibitor, an extreme pressure agent, an anti-oxidant, a metal deactivator, a dye and the like. Whether or not such additives are employed and the amounts thereof depend to a large extent upon the severity of the conditions to which the composition is subject and upon the stability of the synthetic lubricating oil base in the first instance. Since the polyorgano siloxanes, for example, are in general more stable than mineral oils, they require the addition of very little, if any, oxidation inhibitor. When such conventional additives are used they are generally added in amounts between about 0.01 and about 5 percent by weight based on the weight of the total composition.

In those instances when an auxiliary thickening agent such as finely-divided amorphous silica, bentonite-organic base command or esterified siliceous solid is employed, it is added in amounts of about 0.5 to about 3 percent by weight.

In compounding a composition of the present invention, various mixing and blending procedures may be used. According to one embodiment of the invention, the synthetic lubricating oil, the p-polyphenyl together with conventional lubricant additives, if desired, are mixed together at room temperature for a period of about 10 to 30 minutes to form a slurry. During this initial mixing period some thickening is evidenced. Some lumps may be formed. The slurry thus formed is then subjected to a conventional milling operation in a ball mill, a colloid mill, homogenizer or similar device used in compounding greases to give the desired degree of dispersion.

In order to illustrate the lubricating characteristics of a grease composition of the invention when used to lubricate bearings operating at 600° F. and at rotational speeds of 20,000 revolutions per minute, Pope spindles were used in a test procedure similar to that outlined by the Coordinating Research Council Tentative Draft (July, 1954), "Research Technique for the Determination of Performance Characteristics of Lubricating Grease in Antifriction Bearings at Elevated Temperatures," CRC Designation L-35. According to the CRC L-35 test method, the test bearings are packed with 3.5 cc. (or equivalent weight) of grease. Because of the extreme short life of bearings packed with 3.5 cc. of grease, the present evaluations were made by packing the bearings completely full with about 6 to 8 grams of grease and using either a standard end cap with no additional grease or a special end cap holding a reservoir of about 10 grams of additional grease. The bearing assembly containing an eight-ball SAE No. 204 ball bearing is mounted on a horizontal spindle and is subjected to a radial load of 5 pounds. The portion of spindle upon which the test bearing assembly is located is encased in a thermostatically controlled oven. By this means the temperature of the bearing can be maintained at a desired elevated temperature which in the tests reported hereinafter was 600° F. The spindle is driven by a consant belt-tension motor drive assembly, capable of giving spindle speeds of 20,000 revolutions per minute. The spindle is operated on a cycling schedule consisting of a series of periods, each period consisting of 20 hours running time and 4 hours shutdown time. The test continues until the lubricant fails. The lubricant is considered to have failed when any one of the following conditions occurs, (1) spindle input power increases to a value approximately 300 percent above the steady state condition at the test temperature; (2) an increase in temperature at the test bearing of 20° F. over the test temperature during any portion of a cycle; or (3) the test bearing locks or the drive belt slips at the start or during the test cycle.

The lubricating oils used in preparing the lubricating compositions shown in Table I are synthetic oils known as QF-6-7024 Fluid and QF-6-7039 each of which is marketed by Dow-Corning Corporation. QF-6-7204 Fluid is considered to be a methylphenylsiloxane polymer wherein the "end" silicon atoms are substituted to a high degree by two phenyl groups and one methyl group. The material is highly resistant to radiation. QF-6-7024 Fluid has as typical characteristics a viscosity at 100° F. of about 930 to 1030 SUS, a viscosity at 210° F. of about 90 to 100 SUS, a viscosity index of about 108 to 110 and a pour point of +10° to +20° F. It is believed that the types of side chains present and their approximate molar percentages (in brackets) in QF-6-7024 are phenyl (65), methyl attached through silicon to methyl (25) and methyl attached through silicon to phenyl (10). An ideal molecule of a polyorgano siloxane having this analysis is as follows:

CH$_3$(C$_6$H$_5$)$_2$SiO[(CH$_3$)$_2$SiO]$_2$
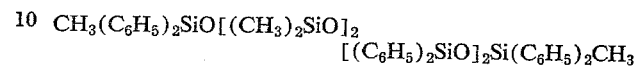

The oil known as QF-6-7039 Fluid is also considered to be a methylphenylsiloxane polymer inhibited against deterioration and otherwise similar to QF-6-7024 Fluid.

The p-polyphenyl used in preparing the illustrative compositions of the invention was prepared according to the following procedure: Into a flask equipped with a stirrer were placed 156 grams (2 moles) of benzene and 133 grams (1 mole) of anhydrous aluminum chloride. Two milliliters of water were then added dropwise with stirring to the contents of the flask. After dropwise addition of the water was completed, 134 grams (1 mole) of anhydrous cupric chloride was added. The mixture was then heated to about 42° C. under nitrogen. After reaching this temperature, the reaction was allowed to proceed for 30 minutes during which time the temperature dropped to about 38° C. Hydrogen chloride was evolved. The reaction mixture was then hydrolyzed by adding the mixture to water. The finely-divided solid which settled out was filtered and washed alternately with boiling water and boiling hydrochloric acid (18%) until a final washing with the hot water gave washings which were substantially colorless. The solid was then washed alternately with boiling sodium hydroxide (2M) and boiling water until the filtrate was colorless. The p-polyphenyl thus obtained was dried overnight in an oven at 120° C. The dried p-polyphenyl weighing 22 grams was in the form of a finely-divided, light brown solid. The yield of p-polyphenyl based on cupric chloride and the equation shown hereinabove was about 57 percent by weight. No significant amount of chlorine was found in the p-polyphenyl. Neither metals nor their salts were detected in the p-polyphenyl. The infrared spectrum of the product supported the para configuration, with phenyl end groups constituting a minor part of the structure. A strong absorption band occurred at 808 cm.$^{-1}$, characteristic of para substitution. Medium absorption bands were obtained at 1000 and 767 cm.$^{-1}$. Weak absorption bands appeared at 3030, 1600, 1400, 1340, 1155, 1120, 1040, 720 and 693 cm.$^{-1}$. Carbon and hydrogen determinations on four samples of the p-polyphenyl varied from 92.73 to 93.36 percent by weight of carbon and 4.88 to 5.28 percent by weight of hydrogen. Theoretical amounts of carbon and hydrogen for C$_6$H$_4$ is 94.7 percent carbon and 5.3 percent hydrogen. The C/H atomic ratio varied from 1.46 to 1.59. p-Polyphenyl possesses a limiting theoretical C/H atomic ratio of 1.5 The infrared spectrum and the percent by weight of carbon and hydrogen remained about the same even after prolonged heating of the polymer at 600° F. The polymer was stable in the atmosphere at temperatures up to about 530° C.

The "Cab-O-Sil" employed in preparing the compositions shown in Table I is a finely-divided amorphous silica marketed by Godfrey L. Cabot, Inc. This silica is a submicroscopic particulate silica prepared in a hot gaseous environment (1100° C.) by the vapor-phase hydrolysis of a silicon compound. On a moisture-free basis, this silica is 99.0 to 99.7 percent silicon dioxide which is practically free from contaminating metallic salts. Gravimetric analyses fail to detect the presence of any calcium or magnesium. The iron content has been found to be about 0.004 percent and volatile matter removed on ignition at 1000° C. amounts to less than 1 percent. "Cab-O-Sil" is an extremely fine silica with particles ranging in size from 0.015 to 0.020 micron.

In preparing the illustrative lubricating compositions, the oil, the p-polyphenyl and the silica (when used) were mixed at room temperature for a period of 10 to 30 minutes. The slurry thus formed was passed twice through a Premier Colloid Mill set at a stator-rotor clearance of 0.0015 inch. The approximate make-up and properties of the thickened lubricating compositions thus prepared are set forth in Table I.

TABLE I

| Composition, Percent By Weight | A | B | C | D |
|---|---|---|---|---|
| Lubricating Oil: | | | | |
| QF-6-7024 | 84 | 85.16 | | |
| QF-6-7039 | | | 84 | 85.16 |
| p-Polyphenyl | 16 | 13.84 | 16 | 13.84 |
| Cab-O-Sil | | 1.00 | | 1.00 |
| Inspection: | | | | |
| Penetration D-1403— | | | | |
| Unworked (Conv. to D217) | 314 | 332 | 309 | 328 |
| Worked (Conv. to D217) | 324 | 335 | 321 | 347 |
| Dropping Point, °F | 710+ | 750+ | 750+ | 750+ |
| Performance Life, Hours— | | | | |
| Results of two tests at 20,000 r.p.m. and 600° F. | 97 / 77 | 96 / 115 | 99 / 78 | 99 / 95 |

The long performance life of compositions of the invention at a high rotational speed and a high temperature is self evident from the above data.

Other lubricating compositions within the scope of the invention are illustrated in Table II. The polyaryl ethers shown in Table II have the following typical characteristics.

| | (1) | (2) | (3) |
|---|---|---|---|
| Viscosity, SUS: | | | |
| At 100° F | 1,567 | 1,691 | 8,565 |
| At 210° F | 70 | 71 | 118 |
| Pour Point, °F | +35 | +40 | +70 |

(1) m-Bis(m-phenoxyphenoxy)benzene.
(2) Bis(phenoxyphenoxy)benzene (mixed isomers).
(3) Bis-m(m-phenoxyphenoxy)phenyl ether.

TABLE II

| Composition, Percent By Weight | E | F | G | H | I |
|---|---|---|---|---|---|
| Polyaryl Ether: | | | | | |
| m-Bis(m-phenoxyphenoxy)benzene | 75 | | | 87 | |
| Bis(phenoxyphenoxy)benzene (mixed isomers) | | 70 | | | 80 |
| Bis-m(m-phenoxyphenoxy)phenyl ether | | | 60 | | |
| p-Polyphenyl | 25 | 30 | 40 | 10 | 19.5 |
| Cab-O-Sil | | | | 3 | 0.5 |

While our invention has been described with reference to various specific examples and embodiments, it will be understood that the invention is not limited to such examples and embodiments and may be variously practiced within the scope of the claims hereinafter made.

We claim:
1. A lubricating composition comprising a dispersion in a major amount of synthetic lubricating oil selected from the group consisting of liquid polyorgano siloxanes having diphenylmethylsilyl end groups and polyaryl ethers of a sufficient amount to thicken the lubricating oil to a grease consistency of p-polyphenyl.
2. The lubricating composition of claim 1 wherein the p-polyphenyl comprises about 10 to about 40 percent by weight of the total composition.
3. A lubricating composition comprising a dispersion in a major amount of a liquid polyorgano siloxane having diphenylmethylsilyl end groups of about 10 to about 40 percent by weight of p-polyphenyl and about 0.5 to about 3 percent by weight of finely-divided silica.
4. A lubricating composition comprising a dispersion in a major amount of a liquid polyphenyl ether of about 10 to about 40 percent by weight of p-polyphenyl and about 0.5 to about 3 percent by weight of finely-divided silica.

References Cited by the Examiner

UNITED STATES PATENTS 3,081,262   3/1963   Goodrich _____ 252—59 X
3,105,054   9/1963   Harris _____ 252—59 X DANIEL E. WYMAN, *Primary Examiner.*

I. VAUGHN, *Assistant Examiner.*